(12) United States Patent
Bradier et al.

(10) Patent No.: US 12,027,871 B2
(45) Date of Patent: Jul. 2, 2024

(54) ELECTRIC POWER SUPPLY SYSTEM FOR AN AIRCRAFT

(71) Applicant: Airbus Operations SAS, Toulouse (FR)

(72) Inventors: Matthieu Bradier, Toulouse (FR); Ludovic Lam Shang Leen, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 108 days.

(21) Appl. No.: 17/958,558

(22) Filed: Oct. 3, 2022

(65) Prior Publication Data

US 2023/0114737 A1 Apr. 13, 2023

(30) Foreign Application Priority Data

Oct. 8, 2021 (FR) ...................................... 2110681

(51) Int. Cl.
*B64D 31/14* (2006.01)
*H02J 4/00* (2006.01)

(52) U.S. Cl.
CPC .............. *H02J 4/00* (2013.01); *H02J 2310/44* (2020.01)

(58) Field of Classification Search
CPC ........ H02J 2310/44; H02J 4/00; B64D 27/24; B64D 31/14
USPC .................................. 307/11, 29, 43; 244/62
See application file for complete search history.

(56) References Cited

U.S. PATENT DOCUMENTS

| 4,403,292 | A | * | 9/1983 | Ejzak | ..................... | B64D 47/00 |
| | | | | | | 700/297 |
| 5,594,285 | A | * | 1/1997 | Wisbey | ................... | B64D 41/00 |
| | | | | | | 361/624 |
| 5,606,245 | A | * | 2/1997 | Kirby | ........................ | H02J 9/00 |
| | | | | | | 307/29 |
| 2012/0319469 | A1 | * | 12/2012 | Krenz | ..................... | H02J 3/007 |
| | | | | | | 307/9.1 |
| 2018/0112599 | A1 | | 4/2018 | Dalal | | |

OTHER PUBLICATIONS

French Search Report dated Jun. 7, 2022; priority document.

* cited by examiner

*Primary Examiner* — Rexford N Barnie
*Assistant Examiner* — Terrence R Willoughby
(74) *Attorney, Agent, or Firm* — Greer, Burns & Crain, Ltd.

(57) ABSTRACT

An electric power supply system for an aircraft includes: a first electric source and a second electric source coupled together to supply electric power to a set of electrical loads, and a controller configured to acquire a piece of information on the current electric consumption consumed by the set of electrical loads; acquire a piece of information corresponding to a target ratio of the distribution, between the first and second electric sources, of the current electric consumption consumed by the set of electrical loads; perform frequency filtering of the current electric consumption to determine a transient consumption portion of the current electric consumption; determine control setpoints for the first electric source and for the second electric source in accordance with the target distribution ratio and with the transient consumption portion; and apply the control setpoints to the first and second electric sources.

18 Claims, 9 Drawing Sheets

ELECTRIC POWER SUPPLY SYSTEM FOR AN AIRCRAFT

CROSS-REFERENCES TO RELATED APPLICATIONS

This application claims the benefit of the French patent application No. 2110681 filed on Oct. 8, 2021, the entire disclosures of which are incorporated herein by way of reference.

BACKGROUND OF THE INVENTION

The invention relates to the field of supplying electric power to aircraft. An aircraft generally comprises a set of electric generators which are provided to supply electric power to electrical loads of the aircraft, such as, for example, computers, actuators, etc. The electrical loads are, for example, coupled to the electric generator via an electrical master box of the aircraft. An electric generator is, for example, driven mechanically by a propulsion engine of the aircraft, so as to make operation of the generator possible. Thus, such a generator draws part of the mechanical power delivered by the propulsion engine. Consequently, mechanical coupling of the electric generator to the propulsion engine makes it necessary to provide an idling speed of the engine which is sufficiently high not to risk the engine stalling. In phases of use of the aircraft for which reduced thrust of the propulsion engines is desired, for example on the approach to a landing strip or during a taxiing phase, it would sometimes be desirable to be able to lower the idling speed of the propulsion engines, notably in order to economize on fuel.

A known solution to this problem consists in adjoining an auxiliary current source, for example an electric battery, to the electric generator. A control system orders the electric battery and the electric generator to be coupled to power distribution busbars of the electrical master box supplying power to the electrical loads. Outside the idling phases of the propulsion engine, the control system orders only the electric generator to be coupled to the power distribution busbars supplying power to the electrical loads. During idling phases of the propulsion engine to which the generator is coupled, in the event of increased demand for electric power by the electrical loads, the control system furthermore orders the electric battery to be coupled to the power distribution busbars supplying power to the electrical loads.

Consequently, the electric generator and the electric battery are then connected in parallel to the power distribution busbars supplying power to the electrical loads. The result of this is that the electric battery then delivers an electric current corresponding to the maximum of its capacity. The result of this is that the electric battery may then discharge more rapidly than necessary. The result of this may also be premature wear of the battery.

In addition, even outside the aforementioned idling phases of the engines of the aircraft, there is sometimes a need to distribute, between a plurality of sources or electric generators, delivery of the electric power consumed by the electrical loads. This need may, for example, be linked to constraints on the size of the sources or of the electric generators, or may correspond to a need for hybrid delivery of the electric power from electric sources of different sorts (for example: an electric generator coupled to a propulsion engine, fuel cells, an electric battery, etc.).

SUMMARY OF THE INVENTION

The aim of the present invention is notably to provide a solution to this problem. It relates to an electric power supply system for an aircraft, the system comprising at least a first electric source and a second electric source coupled together in order to supply electric power to a set of electrical loads of the aircraft, as well as a controller configured to control the first electric source and the second electric source. The electric power supply system is noteworthy in that the controller is configured to:

- acquire a piece of information on the current electric consumption consumed by the set of electrical loads, this piece of information on the current electric consumption originating from at least one sensor;
- acquire a piece of information corresponding to a target ratio of the distribution, between the first electric source and the second electric source, of the current electric consumption consumed by the set of electrical loads, for a current phase of use of the aircraft;
- perform frequency filtering of the current electric consumption so as to determine a transient consumption portion of the current electric consumption;
- determine control setpoints for the first electric source and for the second electric source in accordance with the target distribution ratio and with the transient consumption portion; and
- apply the control setpoints to the first electric source and to the second electric source.

Thus, the electric power supply system makes it possible to distribute delivery of electric power between the first electric source and the second electric source according to the ratio, it being possible to adjust this ratio in accordance with phases of flight or of use of the aircraft. Moreover, in the event of transiently increased demand for power, the corresponding increase in power is demanded from the electric sources in a controlled manner, this making it possible to avoid an uncontrolled increase in the electric power demanded from an electric source. The increase in power is, for example, demanded from only the second electric source, this making it possible to avoid an increase in the electric power demanded from the first electric source. When the first electric source corresponds to a generator coupled to a propulsion engine of the aircraft, this makes it possible to reduce the idling speed of the propulsion engine, so that this idling speed is adjusted to the power delivered by the first electric source in accordance with the ratio, without it being necessary to leave a power margin corresponding to a transient increase in power.

According to various embodiments, which may be taken in isolation or in combination:

- the controller is configured to determine the control setpoints for the first electric source and for the second electric source so as to distribute the electric consumption of the set of electrical loads between the first electric source and the second electric source according to the target distribution ratio when the transient consumption portion is zero, and to demand delivery of a non-zero transient consumption portion only from the second electric source;
- the controller comprises a first frequency filter;
- the first frequency filter receives as input the current electric consumption, the control setpoint for the first electric source corresponds to the product of an output of the first frequency filter and a coefficient which depends on the target distribution ratio and the control setpoint for the second electric source corresponds to a difference between the current electric consumption and the control setpoint for the first electric source;
- the first frequency filter receives as input the product of the current electric consumption and a coefficient which depends on the target distribution ratio, the control setpoint for the first electric source corresponds to an output of the first frequency filter and the control setpoint for the second electric source corresponds to a difference between the current electric consumption and the control setpoint for the first electric source;

the controller comprises at least two frequency filters and the controller is configured so that the control setpoint for the first electric source corresponds to the product of the current electric consumption and a coefficient which depends on the target distribution ratio, multiplied by the product of transfer functions of the various frequency filters, and the control setpoint for the second electric source corresponds to a difference between the current electric consumption and the control setpoint for the first electric source;

the controller comprises two frequency filters, namely the first frequency filter and a second frequency filter, the first frequency filter receives as input the current electric consumption, the second frequency filter receives as input the product of an output of the first frequency filter and the coefficient which depends on the target distribution ratio and the control setpoint for the first electric source corresponds to an output of the second frequency filter;

the controller comprises two frequency filters, namely the first frequency filter and a second frequency filter, the first frequency filter receives as input the current electric consumption, the second frequency filter receives as input an output of the first frequency filter and the control setpoint for the first electric source corresponds to the product of an output of the second frequency filter and the coefficient which depends on the target distribution ratio;

the controller comprises two frequency filters, namely the first frequency filter and a second frequency filter, the first frequency filter receives as input the product of the current electric consumption and the coefficient which depends on the target distribution ratio, the second frequency filter receives as input an output of the first frequency filter and the control setpoint for the first electric source corresponds to an output of the second frequency filter;

each of the frequency filters comprises at least one low-pass filter;

the piece of information on the current electric consumption consumed by the set of electrical loads corresponds to a piece of information on the current electric power consumed by the set of electrical loads or to a piece of information on the current electric current consumed by the set of electrical loads;

one of the first electric source and the second electric source corresponds to an electric generator mechanically coupled to a shaft of a high-pressure stage of a propulsion engine of the aircraft and the other to an electric generator mechanically coupled to a shaft of a low-pressure stage of a propulsion engine of the aircraft;

the first electric source corresponds to an electric generator mechanically coupled to a propulsion engine of the aircraft and the second electric source corresponds to an electric battery or to a supercapacitor;

the first electric source corresponds to a fuel cell and the second electric source corresponds to an electric battery or to a supercapacitor;

The invention also relates to an aircraft comprising such an electric power supply system.

BRIEF DESCRIPTION OF THE DRAWINGS

The invention will be better understood upon reading the following description and upon studying the appended figures.

DETAILED DESCRIPTION OF THE PREFERRED EMBODIMENTS

Figure 1:
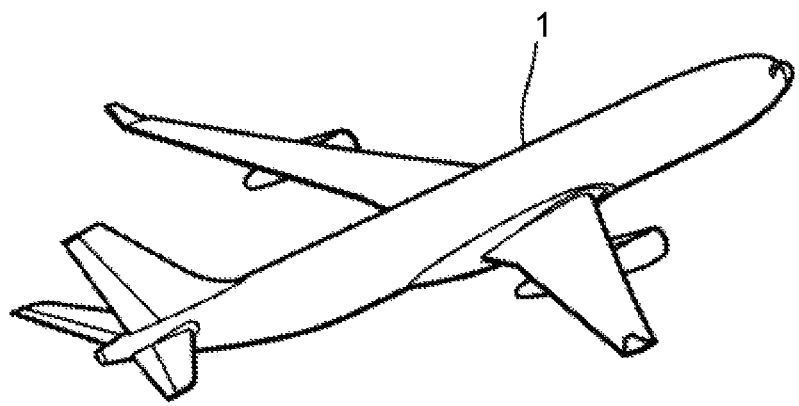
FIG. 1 illustrates an aircraft equipped with an electric power supply system according to one embodiment of the invention.
Figure 2:
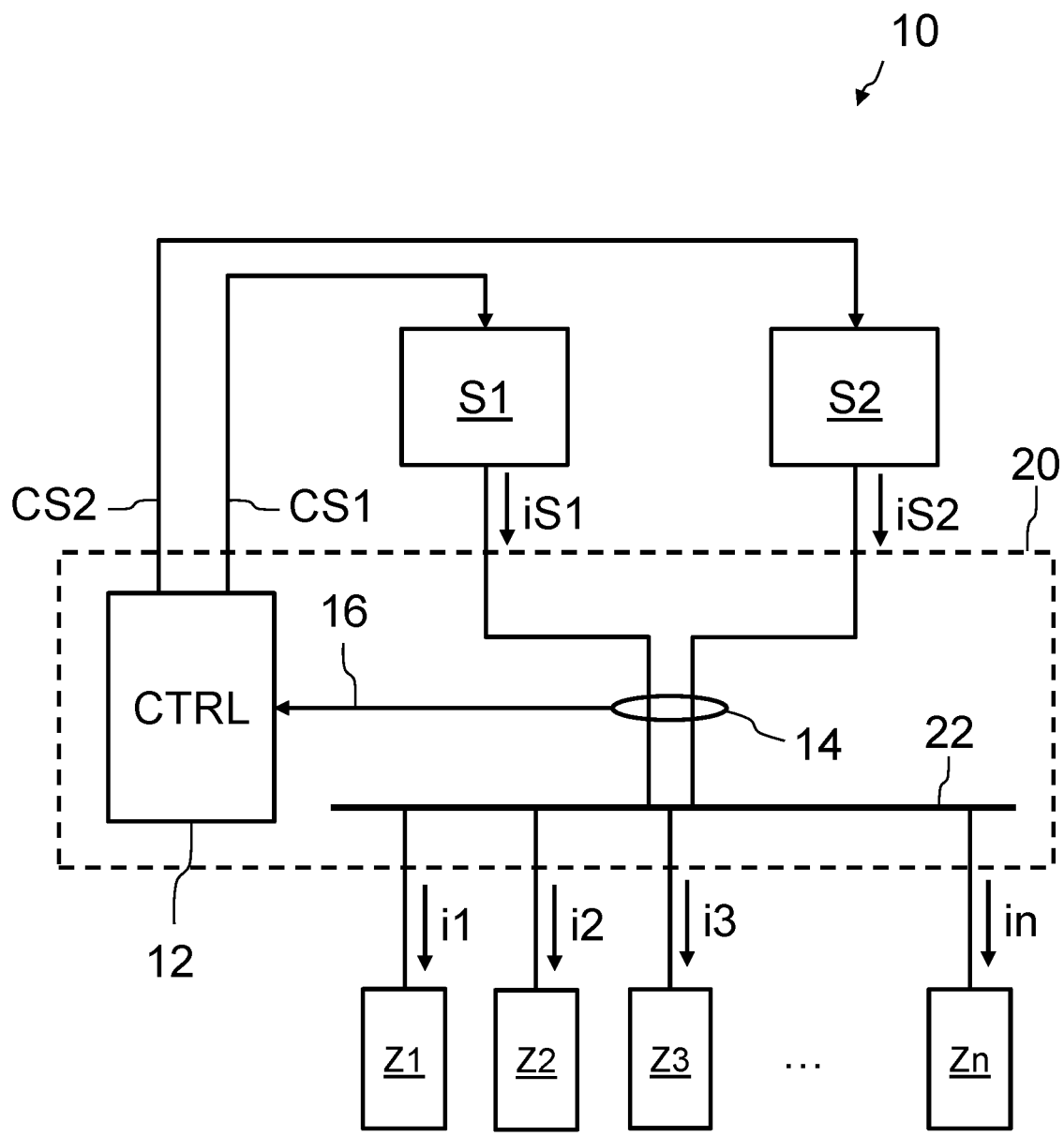
FIG. 2 schematically illustrates an electric power supply system for an aircraft according to one embodiment of the invention.

The electric power supply system 10 shown in FIG. 2 is, for example, installed in an aircraft such as the aircraft 1 illustrated in FIG. 1. The electric power supply system 10 comprises a first electric power supply source S1 and a second electric power supply source S2, which are provided to supply electric power to a set of electrical loads Z1, Z2, Z3 ... Zn. The outputs of the electric sources S1 and S2 are, for example, connected to an electric power supply busbar 22 of an electrical master box 20 of the aircraft. The electrical loads Z1, Z2, Z3 ... Zn are also connected to the electric power supply busbar 22. The electric power supply system 10 comprises a controller 12, labelled CTRL in the figure, provided to control operation of the electric sources S1 and S2. The controller 12 receives as input, via a connection 16, a piece of information on the current electric consumption consumed by the set of electrical loads Z1, Z2, Z3 ... Zn. The controller 12 delivers as output a control signal CS1 for the first electric source S1 and a control signal CS2 for the second electric source S2. In one non-limiting embodiment of the invention, the controller 12 is installed in the electrical master box 20, as shown in FIG. 2. The piece of information on the current electric consumption corresponds, for example, to an electric power or to an electric current. This piece of information is, for example, measured by means of a sensor 14. According to a first alternative, the sensor 14 is a sensor measuring, in a common manner, the electric power or the current delivered by the first electric source S1 and by the second electric source S2, as illustrated in FIG. 2. According to a second alternative, a sensor is associated with each connection between the electric sources S1 or S2 and the electric power supply busbar 22. For example, one sensor measures a current iS1 originating from the first electric source S1 and another sensor measures a current iS2 originating from the second electric source S2. According to a third alternative, a sensor is associated with each connection between an electrical load and the electric power supply busbar 22. For example, a set of sensors measure the currents i1, i2, i3 . . . in flowing between the electric power supply busbar 22 and the electrical loads Z1, Z2, Z3 . . . Zn, respectively.

Figure 3:
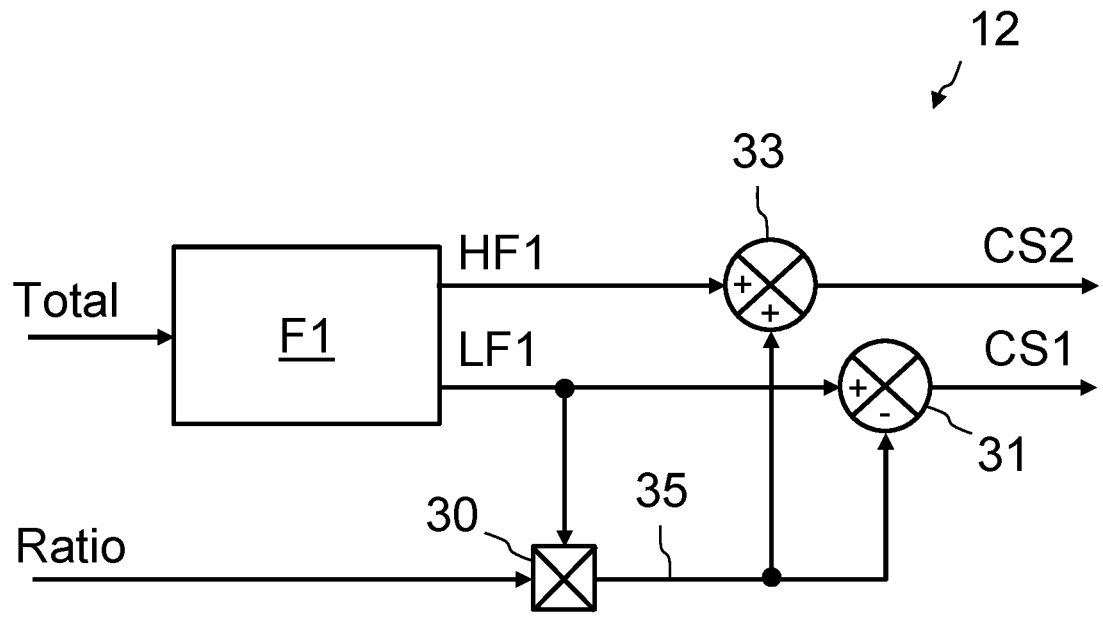
FIG. 3 schematically illustrates one embodiment of a controller of the electric power supply system shown in FIG. 2.

In a first embodiment shown in FIG. 3, the controller 12 comprises a frequency filter F1. This frequency filter F1 receives as input a signal labelled "Total" in the figure, corresponding to the piece of information on the current electric consumption received by the controller 12 by means of the connection 16. The filter F1 delivers as output two signals LF1 and HF1 corresponding to a low-frequency component and to a high-frequency component of the signal "Total", respectively, and such that the sum of the low-frequency and high-frequency components corresponds to the signal "Total". The controller 12 also receives or acquires a signal "Ratio" corresponding to a target ratio of the distribution, between the first electric source S1 and the second electric source S2, of the current electric consumption consumed by the set of electrical loads, for a current phase of use of the aircraft. According to one alternative, the controller 12 receives the signal "Ratio" from an avionics computer of the aircraft, for example a flight control computer of the aircraft, a computer for managing a propulsion engine of the aircraft, in particular of FADEC (Full Authority Digital Engine Control) type, a flight management computer of the aircraft of FMS (Flight Management System) type, etc. According to another alternative, the controller 12 acquires the signal "Ratio" from a database or by reading a file. Except in particular cases, this signal "Ratio" corresponds to a number between 0 and 1, or indeed between 0% and 100%. This number represents the portion of the electric consumption of the electrical loads Z1, Z2, Z3 . . . Zn to be delivered by the second electric source S2. The controller 12 further comprises a multiplier 30 and two adders 31 and 33. The multiplier 30 receives as inputs the signal LF1 corresponding to the low-frequency component of the signal "Total", as well as the signal "Ratio". An output of the multiplier 30 is connected via a connection 35 to an additive input of the adder 33, as well as to a subtractive input of the adder 31. The adder 33 also receives the high-frequency component HF1 of the signal "Total" at an additive input and it delivers as output the control signal CS2 for the second electric source S2. The adder 31 also receives the low-frequency component LF1 of the signal "Total" at an additive input and it delivers as output the control signal CS1 for the first electric source S1. Thus, the controller 12 determines the control setpoints CS1 for the first electric source S1 and CS2 for the second electric source S2 so as to distribute the electric consumption of the set of electrical loads (corresponding to the signal "Total") between the first electric source and the second electric source according to the target distribution ratio (corresponding to the signal "Ratio") when the transient consumption portion (corresponding to the signal "HF1") is zero, and to demand delivery of a non-zero transient consumption portion only from the second electric source. Specifically, the control setpoint CS1 for the first electric source S1 is equal to the signal LF1 minus the signal LF1 multiplied by the Ratio, or CS1=(1−Ratio)×LF1. The control setpoint CS2 for the second electric source S2 is equal to the sum of the signal HF1 and the signal LF1 multiplied by the Ratio, or CS2=HF1+Ratio×LF1. Thus, when the current electric consumption consumed by the set of electrical loads comprises a non-zero transient portion HF1, delivery of this transient portion is demanded only from the second electric source S2. This makes it possible to guarantee the stability of the portion of the current electric consumption delivery of which is demanded from the first electric source S1 (corresponding to the setpoint CS1), during transient variations in the current electric consumption. Moreover, at a steady speed, that is to say, when the transient portion of the current electric consumption is zero (corresponding to a zero signal HF1, therefore the signal LF1 then corresponds to the signal Total), delivery of the electric consumption of the set of electrical loads (corresponding to the signal "Total") is distributed between the first electric source S1 (setpoint CS1) and the second electric source S2 (setpoint CS2) according to the target distribution ratio (corresponding to the signal "Ratio"), as the setpoint CS1 is then equal to CS1=(1−Ratio)×LF1 and the setpoint CS2 is then equal to CS2=Ratio×LF1.

Figure 4:
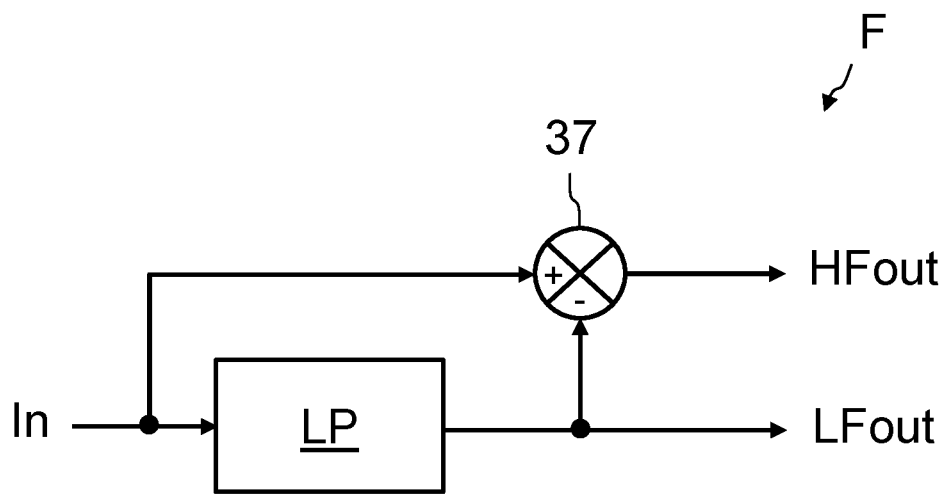
FIG. 4 schematically illustrates one embodiment of a frequency filter of the controller shown in FIG. 3.

In one non-limiting exemplary embodiment of the invention, the filter F1 is similar to the frequency filter F illustrated in FIG. 4. The frequency filter F comprises a low-pass filter LP which receives as input an input signal In of the frequency filter F and which delivers as output a signal LFout corresponding to a low-frequency component of the input signal In. The frequency filter F further comprises an adder 37 which receives the input signal In at an additive input, as well as the output signal LFout of the low-pass filter at a subtractive input. The adder 37 delivers as output a signal HFout corresponding to a high-frequency component of the input signal In. This signal is equal to HFout=In −LFout. According to a first alternative, the low-pass filter LP is a first-order filter. According to a second alternative, the low-pass filter is a second-order filter. Other alternatives are possible for the low-pass filter LP without departing from the scope of the invention. When the filter F1 is similar to the frequency filter F, the input signal Total of the filter F1 corresponds to the input signal In of the filter F and the output signals LF1 and HF1 of the filter F1 correspond to the output signals LFout and HFout of the filter F, respectively.

Without departing from the scope of the invention, rather than comprising a low-pass filter LP as illustrated in FIG. 4, the frequency filter F might comprise a high-pass filter (for example, to produce the output signal HFout) or a band-pass filter, or indeed a combination of low-pass, high-pass and/or band-pass filters.

According to one variant, the multiplier 30 is placed upstream of the input of the frequency filter F1. The multiplier 30 then receives as input the signal "Total" and a signal which depends on the target distribution ratio, more particularly a signal corresponding to "1−Ratio". The input of the filter F1 then receives the output of the multiplier 30, corresponding to the product of the current electric consumption (signal Total) and the coefficient which depends on the target distribution ratio. The control setpoint CS1 for the first electric source S1 then corresponds to the output LF1 of the filter F1 and the control setpoint CS2 for the second electric source S2 corresponds to a difference between the current electric consumption (corresponding to the signal Total) and the control setpoint CS1 for the first electric source.

In a second embodiment, the controller 12 further comprises a second frequency filter F2. In a manner which does not limit the invention, the second frequency filter F2 is similar to the frequency filter F illustrated in FIG. 4. An input of the second frequency filter F2 receives, at least in part, a signal corresponding to the low-frequency component LF1 originating from the first frequency filter F1. In an example illustrated in FIG. 5, the first frequency filter F1 receives as input the signal "Total" corresponding to the current electric consumption and the multiplier 30 receives as input the signal "Ratio" as well as the output LF1 of the first filter F1, as in the first embodiment. The controller 12 further comprises a first adder 32 and a second adder 34. The adder 32 receives the signal LF1 at an additive input, as well as the output of the multiplier 30 at a subtractive input. The second frequency filter F2 receives as input the output of the adder 32. Consequently, the second frequency filter F2 receives as input the product of the low-frequency output LF1 of the first filter F1 and a coefficient which depends on the target distribution ratio (this coefficient being equal to 1−Ratio). The control setpoint CS1 for the first electric source S1 corresponds to a signal LF2 originating from the low-frequency output of the second filter F2. Consequently, the setpoint CS1 corresponds to the product of the signal Total corresponding to the current electric consumption and the coefficient 1−Ratio, multiplied by the product of the transfer functions corresponding to the low-frequency outputs LF1, LF2 of the frequency filters F1 and F2 used to perform frequency filtering. The adder 34 comprises three additive inputs receiving the signal HF1 originating from the high-frequency output of the first filter F1, a signal HF2 originating from the high-frequency output of the second filter F2 and the output of the multiplier 30 via a connection 36, respectively. The control setpoint CS2 for the second electric source S2 corresponds to the output of the adder 34. It corresponds, consequently, to the difference between the signal Total corresponding to the current electric consumption and the control setpoint CS1 for the first electric source S1.

Figure 5:
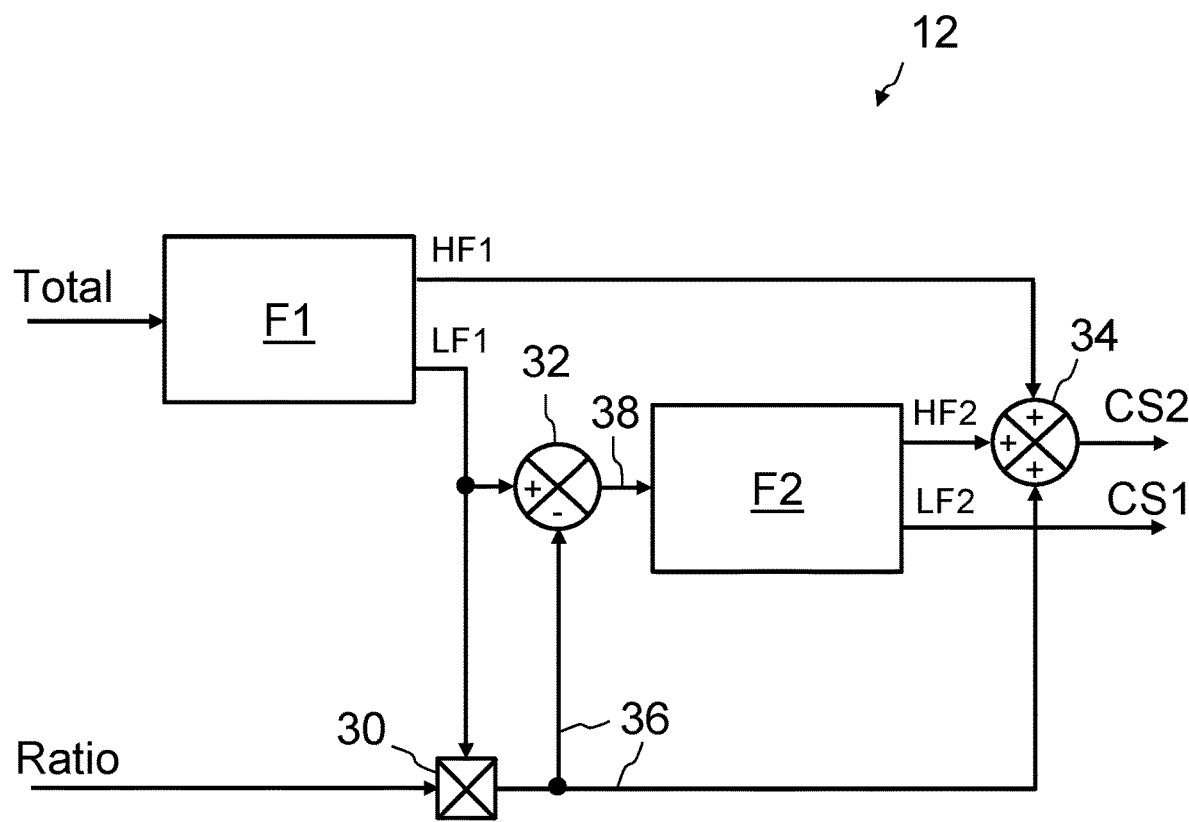
FIG. 5 schematically illustrates another embodiment of a controller of the electric power supply system shown in FIG. 2.
Figure 6:
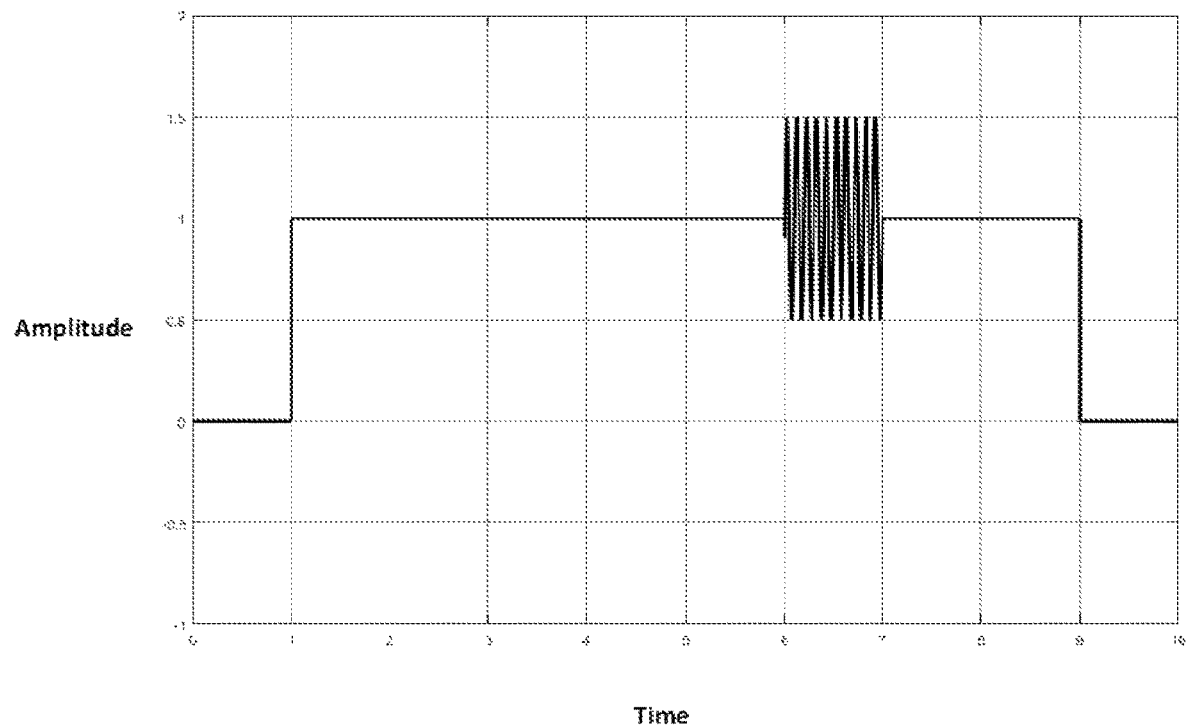
FIG. 6 shows an example of amplitude as a function of time of an input signal "Total" of the controller shown in FIG. 5.
Figure 7:
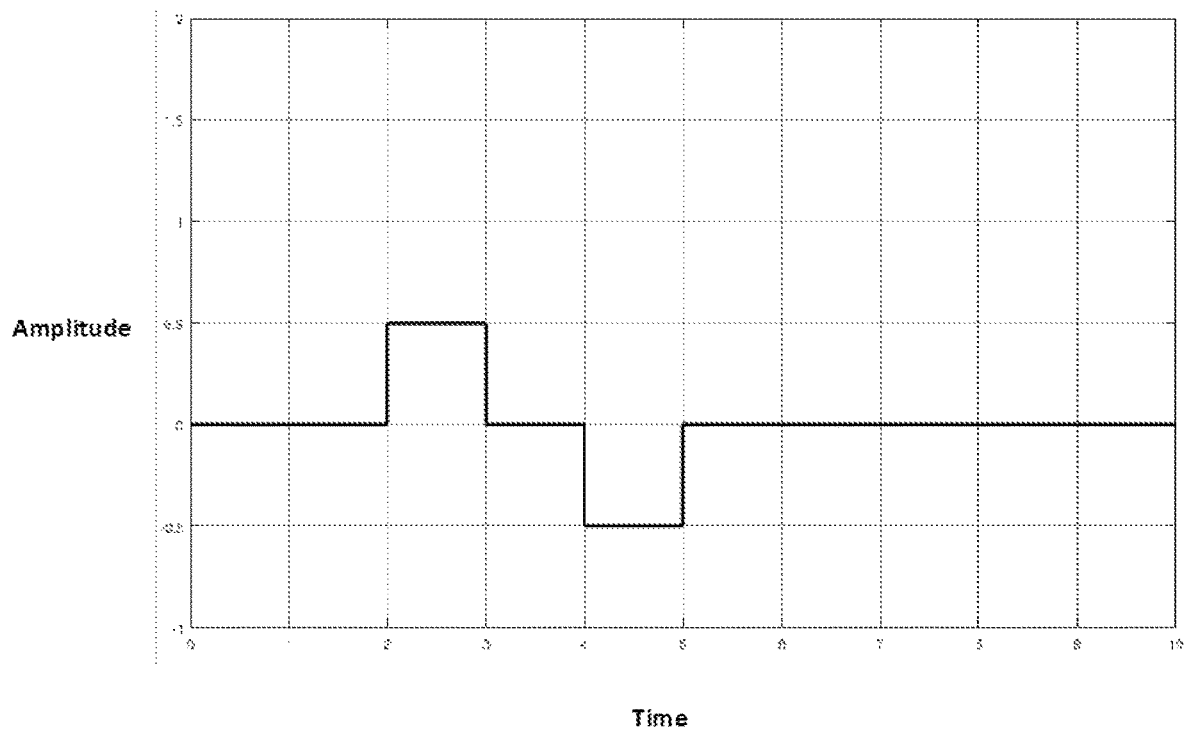
FIG. 7 shows an example of amplitude as a function of time of an input signal "Ratio" of the controller shown in FIG. 5.

Exemplary operation of the controller 12 of FIG. 5 is illustrated in FIGS. 6 to 14, which correspond to the amplitude of signals as a function of time. FIG. 6 and FIG. 7 illustrate the signals Total and Ratio, respectively. In the example, as shown in FIG. 6, the total consumption of the loads Z1, Z2, Z3 . . . Zn is stable, at a level equal to 1, between instants 1 and 9, except between instants 6 and 7, where a demand varying, at high frequency, between the levels 0.5 and 1.5, is superimposed. As shown in FIG. 7, the signal Ratio is equal to zero during phases of operation of the aircraft corresponding to instants 0 to 2, 3 to 4 and 5 to 10. This corresponds to a setpoint for delivery, at a steady speed, of the electrical energy consumed by the electrical loads, by only the first electric source S1, as the control signal CS1 for the first electric source is then equal to: CS1=(1−Ratio)×Total=Total (as Ratio=0). Between instants 2 and 3, the signal Ratio is equal to 0.5, corresponding to a setpoint for distribution in equal portions, at a steady speed, between the first electric source S1 and the second electric source S2, of the electrical energy consumed by the electrical loads. Between instants 4 and 5, the signal Ratio is equal to −0.5, corresponding to a transfer of electrical energy from the first electric source S1 to the second electric source S2.

Figure 8:
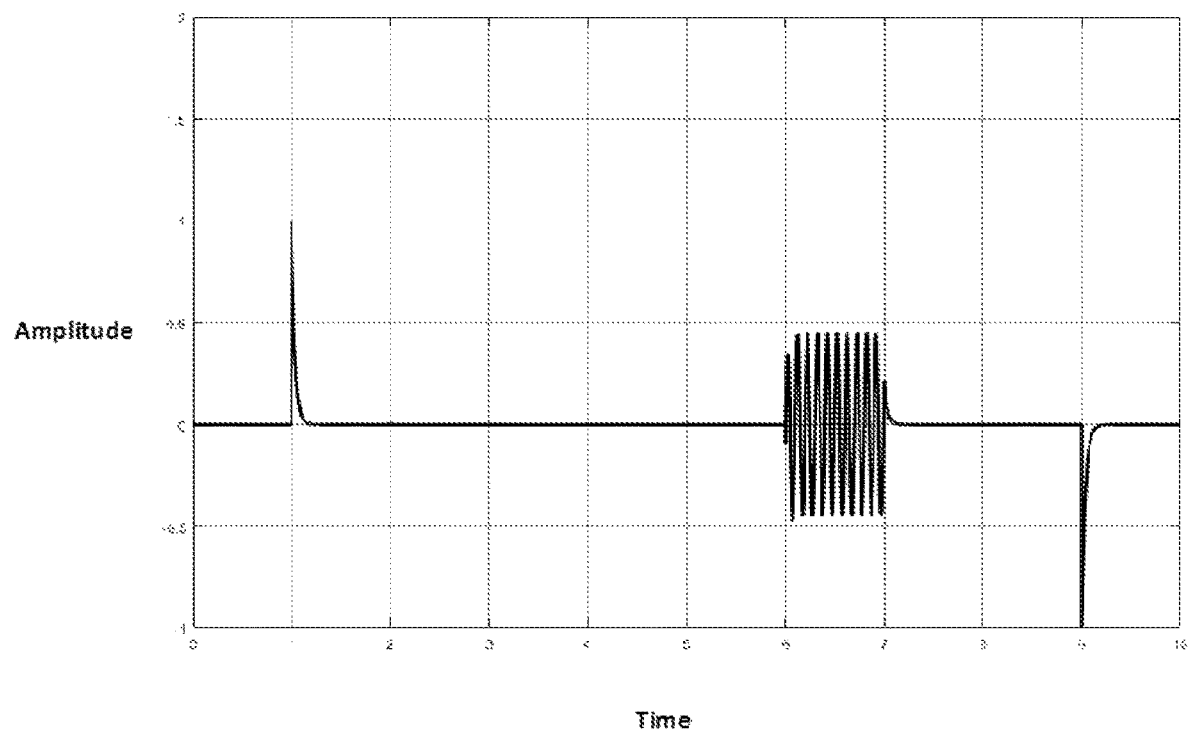
FIG. 8 shows an example of amplitude as a function of time of a signal "HF1" of the controller shown in FIG. 5.
Figure 9:
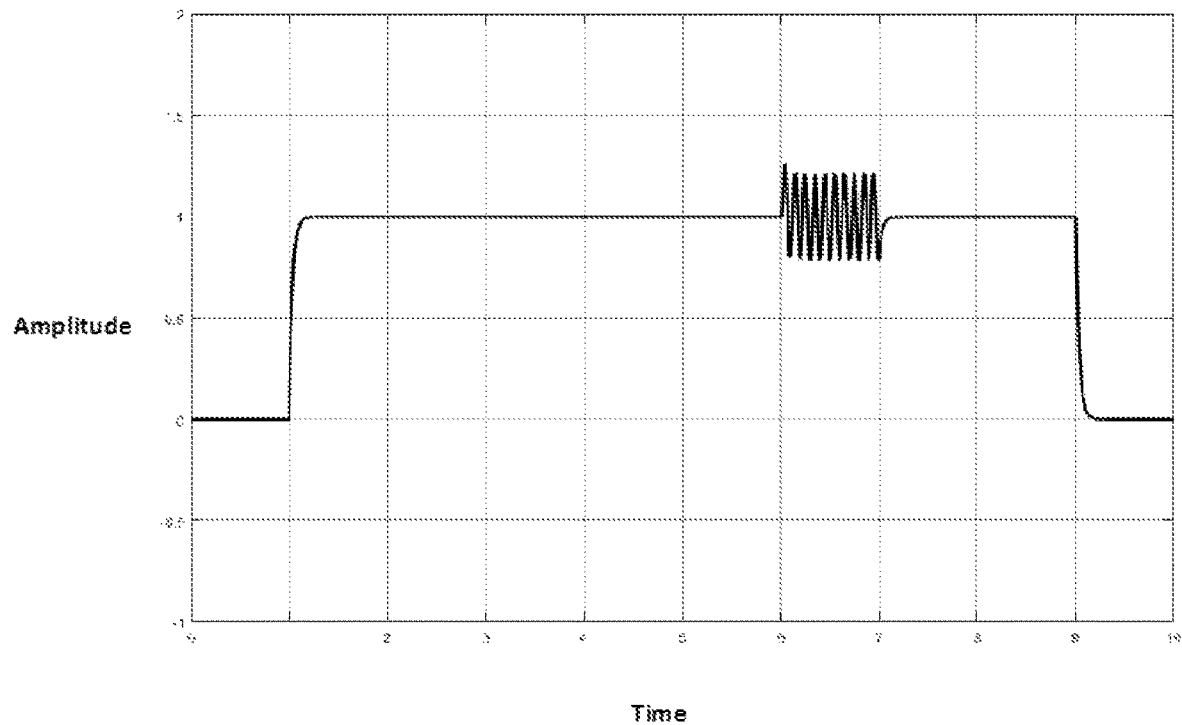
FIG. 9 shows an example of amplitude as a function of time of a signal "LF1" of the controller shown in FIG. 5.
Figure 10:
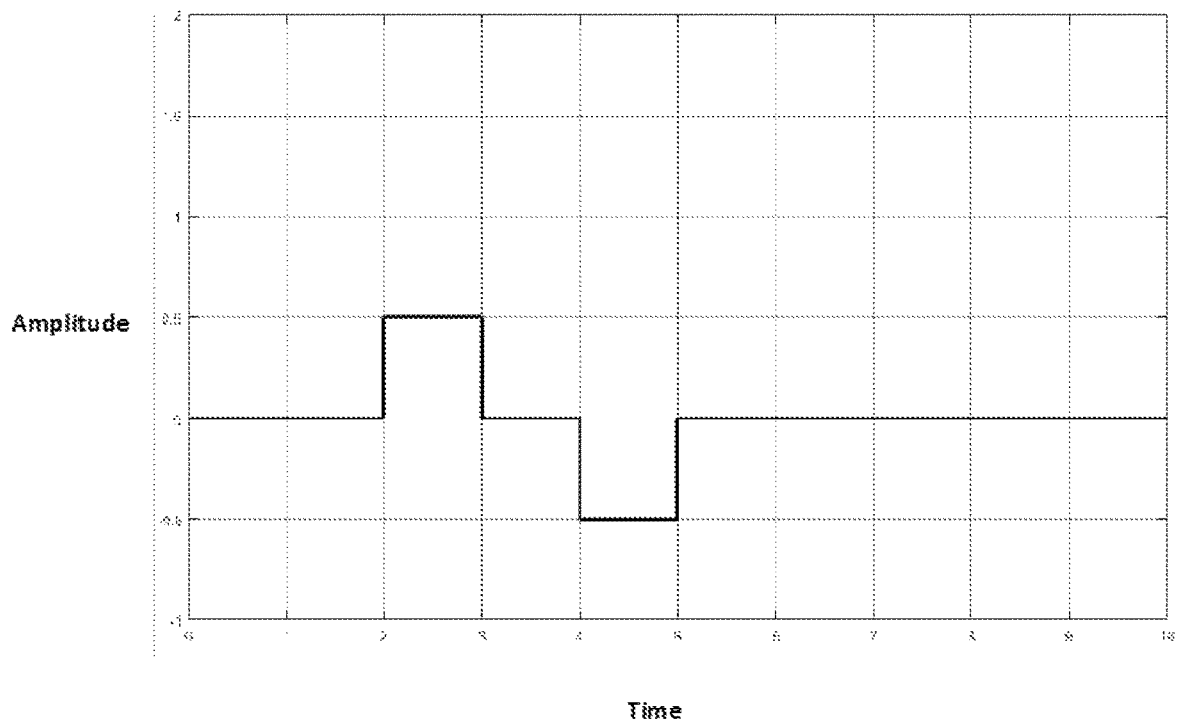
FIG. 10 shows an example of amplitude as a function of time of a signal over a connection 36 of the controller shown in FIG. 5.
Figure 11:
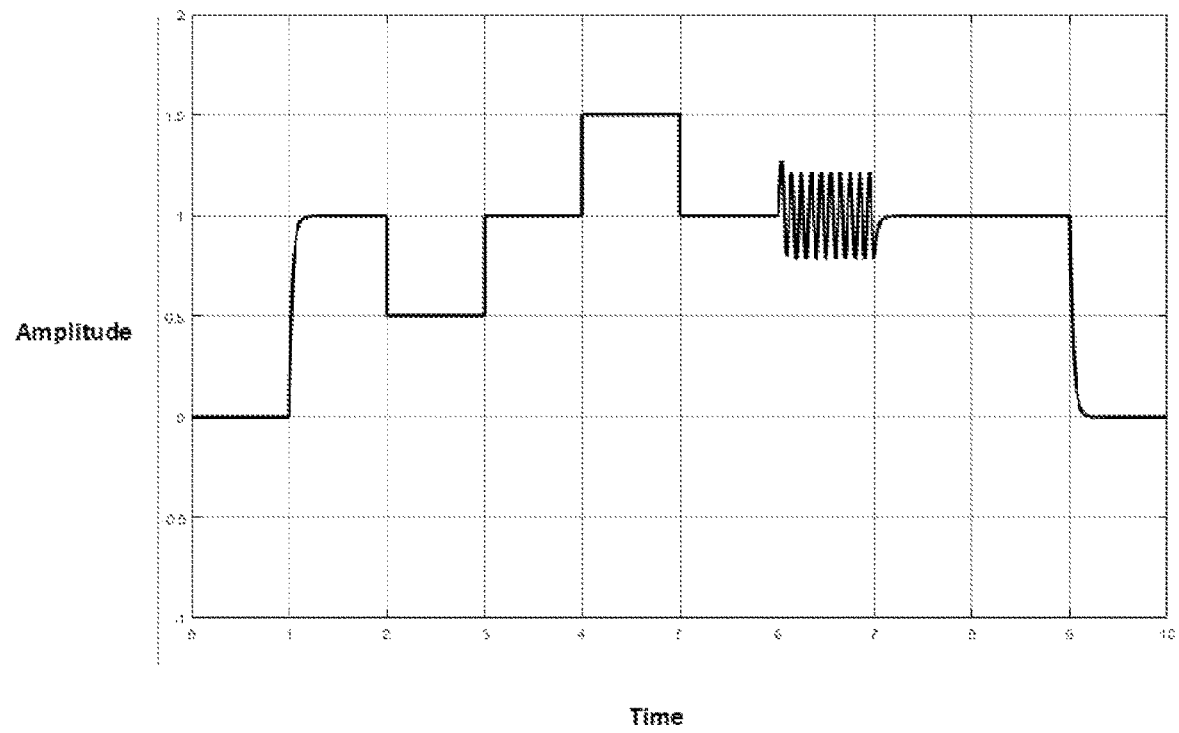
FIG. 11 shows an example of amplitude as a function of time of a signal over a connection 38 of the controller shown in FIG. 5.
Figure 14:
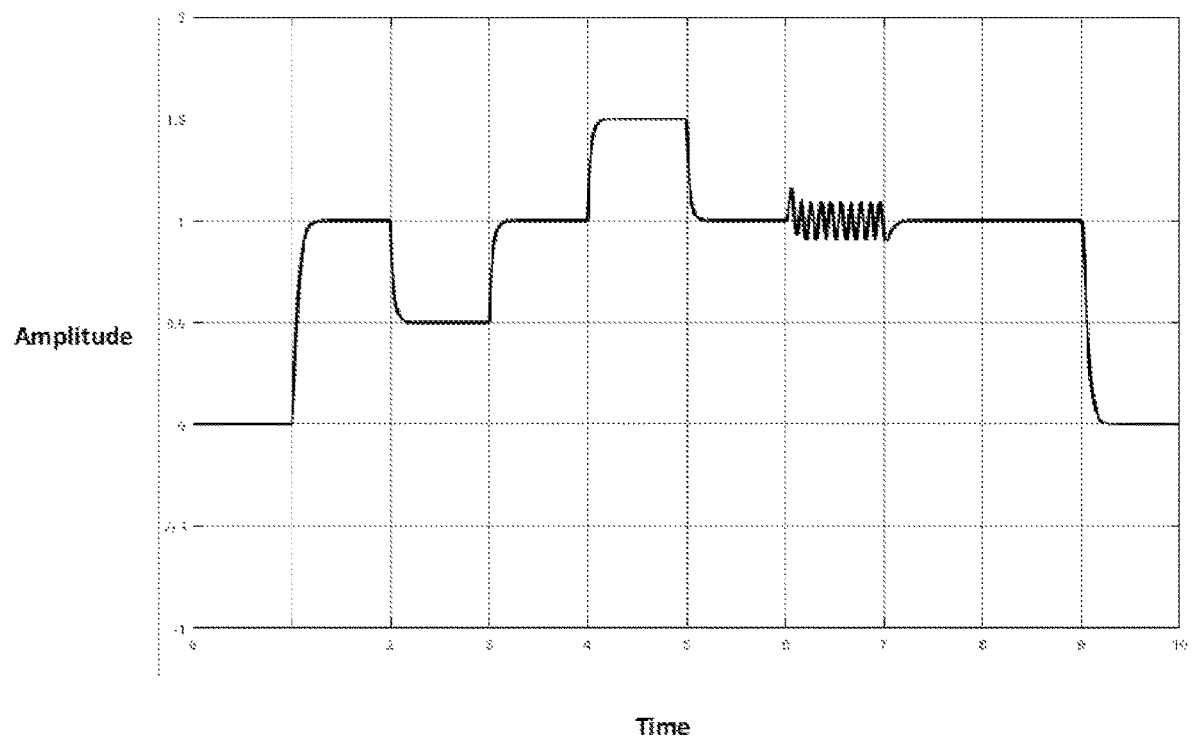
FIG. 14 shows an example of amplitude as a function of time of an output signal "CS1" of the controller shown in FIG. 5.

As shown in FIG. 9, the signal at the low-frequency output LF1 of the first filter F1 corresponds to low-frequency filtering of the input signal Total. When the filter LP is a first-order low-pass filter, the high-frequency variations in the signal Total between instants 6 and 7 are attenuated but not zero. This phenomenon depends notably on the frequency of the variations and on the cut-off frequency of the filter LP. The cut-off frequency is, for example, around 1 Hz. As shown in FIG. 8, the signal at the high-frequency output HF1 of the first filter F1 corresponds to the difference between the input signal Total and the signal LF1. As illustrated in FIG. 10, the signal over the connection 36, at the output of the multiplier 30, corresponds to the product of the signal Ratio and the signal at the output LF1 of the first filter F1. As shown in FIG. 11, the signal over the connection 38 at the input of the second filter F2 is equal to (1−Ratio)× LF1. The signal at the output LF2 of the second filter F2, as illustrated in FIG. 14, corresponds to low-frequency filtering of the signal which is present over the connection 38. In particular, the high-frequency variations between instants 6 and 7 are very attenuated, so that they are not of the sort to interfere with operation of the first electric source S1. This signal at the output LF2 corresponds to the control setpoint CS1 for the first electric source S1.

Figure 12:
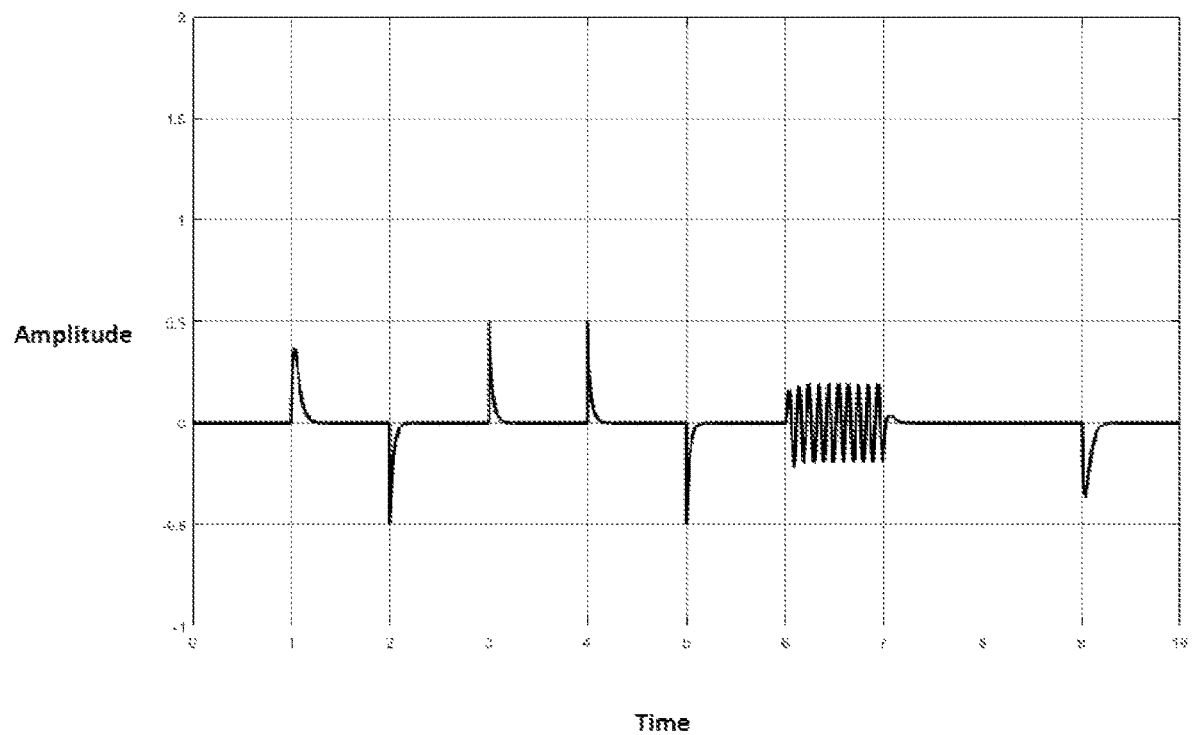
FIG. 12 shows an example of amplitude as a function of time of a signal "HF2" of the controller shown in FIG. 5.
Figure 13:
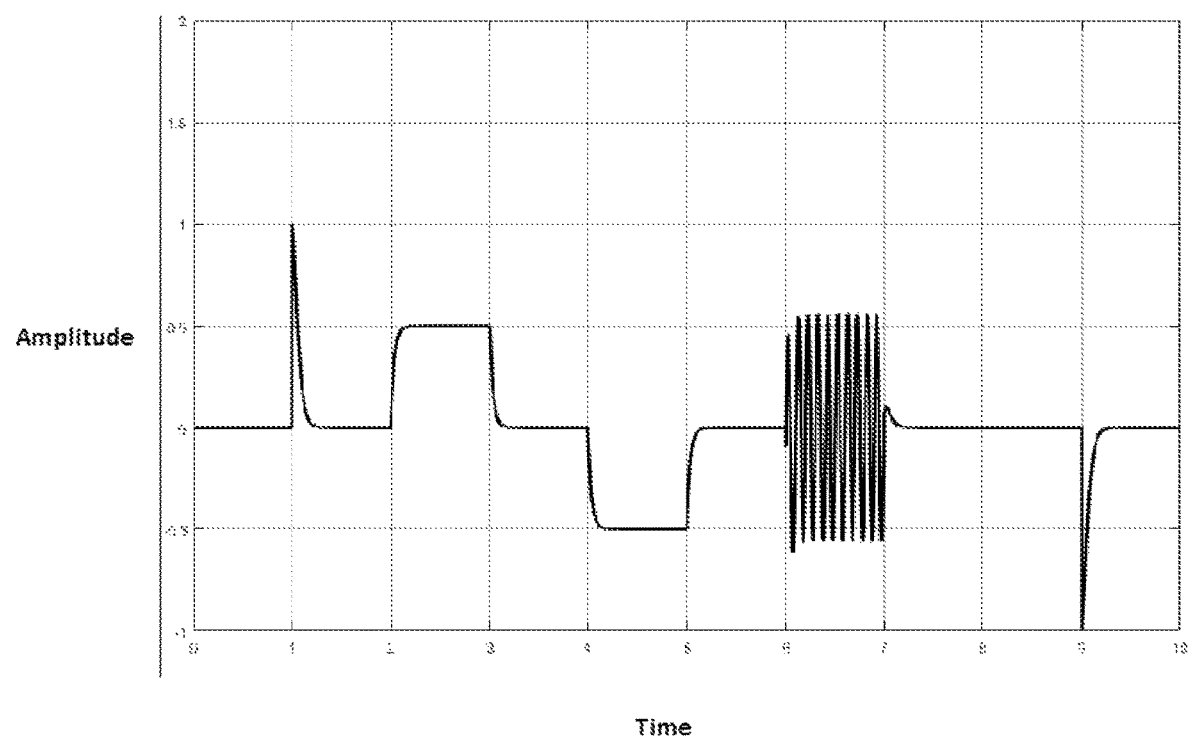
FIG. 13 shows an example of amplitude as a function of time of an output signal "CS2" of the controller shown in FIG. 5.

The signal at the output HF2 of the second filter F2, as illustrated in FIG. 12, corresponds to a high-frequency component of the signal which is present over the connection 38 at the input of the filter F2. The signal illustrated in FIG. 13, corresponding to the setpoint CS2 for the second electric source S2, is equal to the sum of the signal HF2, the signal HF1 and the portion of the signal Total distributed to the second source S2 at a steady speed in accordance with the target distribution ratio. The setpoint signal CS2 does indeed comprise most of the high-frequency variations in the input signal Total between instants 6 and 7. Thus, delivery of the electrical energy corresponding to the high-frequency variations in the electric consumption of the electrical loads is demanded from only the second electric source S2.

In a first variant of the second embodiment, the controller 12 comprises two frequency filters, namely a first frequency filter F1 and a second frequency filter F2. These two filters are, for example, similar to the frequency filter F illustrated by FIG. 4. The frequency filter F1 and, consequently, its first low-pass filter receive as input the signal Total corresponding to the current electric consumption. The frequency filter F2 and, consequently, its second low-pass filter receive as input the low-frequency output of the frequency filter F1, corresponding to the output of the first low-pass filter. The control setpoint CS1 for the first electric source S1 corresponds to the product of the low-frequency output of the frequency filter F2 (corresponding to the output of the second low-pass filter) and the coefficient which depends on the target distribution ratio. This coefficient is, for example, equal to 1−Ratio.

In a second variant of the second embodiment, the controller 12 comprises two frequency filters, namely a first frequency filter F1 and a second frequency filter F2. These two filters are, for example, similar to the filter LP of the frequency filter F illustrated by FIG. 4. The frequency filter F1 and, consequently, the first low-pass filter receive as input the product of the signal Total corresponding to the current electric consumption and the coefficient which depends on the target distribution ratio. The frequency filter F2 and, consequently, the second low-pass filter receive as input the low-frequency output of the frequency filter F1, corresponding to the output of the first low-pass filter. The control setpoint CS1 for the first electric source S1 corresponds to the low-frequency output of the frequency filter F2 (corresponding to the output of the second low-pass filter).

In one embodiment, the first electric source S1 and the second electric source S2 correspond to electric generators, one of which is mechanically coupled to a shaft of a high-pressure stage of a propulsion engine of the aircraft and the other to a shaft of a low-pressure stage of a propulsion engine of the aircraft. Advantageously, the first electric source S1 corresponds to the generator coupled to the shaft of a high-pressure stage of a propulsion engine of the aircraft and the second electric source S2 corresponds to the generator coupled to the shaft of a low-pressure stage of a propulsion engine of the aircraft. This makes it possible to regulate the idling speed of the engine without having to take into account a margin linked to rapid variations in the mechanical power drawn by the electric generator. Specifically, the shaft of a low-pressure stage is less affected than the shaft of a high-pressure stage by rapid variations in the mechanical power drawn from this shaft. Thus, with delivery of the electrical energy corresponding to rapid variations in the electric consumption of the loads Z1, Z2, Z3 . . . Zn being demanded from only the second electric source S2, the result of this is that these variations have an effect only on the mechanical power drawn from the shaft of a low-pressure stage, which is the least sensitive to these variations. This does not modify the mechanical power drawn from the shaft of a high-pressure stage. The term "rapid variations" denotes variations contained in a time interval ranging from 0 seconds to 10 seconds, preferably from 0 seconds to 5 seconds. When frequency filtering comprises low-frequency filtering, a cut-off frequency for this low-frequency filtering is then less than or equal to 10 seconds, or 5 seconds. This cut-off frequency is, for example, chosen as equal to 1 second. In a manner which does not limit the invention, the aforementioned shaft of a high-pressure stage and shaft of a low-pressure stage are shafts of the same propulsion engine of the aircraft.

In another embodiment, the first electric source S1 corresponds to a fuel cell, for example of PEMFC (Proton-Exchange Membrane Fuel Cell or Polymer Electrolyte Membrane Fuel Cell) type. Such a fuel cell has the advantage of having a high energy and power density. However, the energy delivered by this fuel cell must preferably have a slow rate of change in order not to damage the fuel cell. This is therefore compatible with using such a fuel cell as the first electric source S1 as rapid variations in the electric consumption of the loads Z1, Z2, Z3 . . . Zn have no effect on the control setpoint CS1 and therefore on delivery of electrical energy by the first electric source S1. The second electric source S2 corresponds, for example, to an electric battery or to a supercapacitor, which have the advantage of making it possible to deliver electrical energy with a rapid rate of change.

In yet another embodiment, the first electric source S1 corresponds to an electric generator mechanically coupled to a propulsion engine of the aircraft. With delivery of electrical energy corresponding to rapid variations in the electric consumption of the loads Z1, Z2, Z3 . . . Zn being demanded from only the second electric source S2, the result of this is that these variations have no effect on the mechanical power drawn by this generator from the propulsion engine of the aircraft. This makes it possible to regulate the idling speed of the engine without having to take into account a margin linked to these variations. The term "rapid variations" denotes variations contained in a time interval ranging from 0 seconds to 10 seconds, preferably from 0 seconds to 5 seconds. When frequency filtering comprises low-frequency filtering, a cut-off frequency for this low-frequency filtering is then less than or equal to 10 seconds, or 5 seconds. This cut-off frequency is, for example, chosen as equal to 1 second. The second electric source S2 corresponds, for example, to an electric battery or to a supercapacitor, which have the advantage of making it possible to deliver electrical energy with a rapid rate of change. Advantageously, regulation of the idling speed of the propulsion engine depends on phases of flight of the aircraft. The idling speed corresponding to a phase of flight is regulated in accordance with a maximum mechanical power drawn by the electric generator from the propulsion engine of the aircraft at a steady speed during this phase of flight of the aircraft. This maximum mechanical power corresponds, for example, to a predetermined value estimated by the manufacturer of the aircraft or by the airline operating the aircraft, in accordance with the electrical loads which must be supplied with electric power during this phase of flight.

In one particular embodiment, the first and second electric sources S1 and S2 are coupled together so that one of them is controlled in voltage regulation mode and the other in current regulation mode. Advantageously, the first electric source S1 is controlled in voltage regulation mode and the second electric source S2 is controlled in current regulation mode. The setpoint CS2 then corresponds to a setpoint for delivery of current by the second electric source S2.

Although the various embodiments mention two electric sources S1 and S2, the invention is not limited to two electric sources. Without departing from the scope of the invention, the electric power supply system may also comprise a higher number of electric sources.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electric power supply system for an aircraft, said system comprising:
   at least a first electric source,
   a second electric source coupled together in order to supply electric power to a set of electrical loads of the aircraft,
   a controller configured to control the first electric source and the second electric source,
   wherein the controller is configured to:
      acquire a piece of information on a current electric consumption consumed by said set of electrical loads, this piece of information on the current electric consumption originating from at least one sensor;
      acquire a piece of information corresponding to a target ratio of a distribution, between the first electric source and the second electric source, of the current electric consumption consumed by said set of electrical loads, for a current phase of use of the aircraft;

perform frequency filtering of the current electric consumption to determine a transient consumption portion of said current electric consumption;

determine control setpoints for the first electric source and for the second electric source in accordance with the target distribution ratio and with the transient consumption portion so as to distribute the electric consumption of the set of electrical loads between the first electric source and the second electric source according to said target distribution ratio when the transient consumption portion is zero and, when the transient consumption portion is non-zero, to demand delivery of the transient consumption portion only from the second electric source; and apply the control setpoints to the first electric source and to the second electric source.

2. The electric power supply system according to claim 1, wherein the controller comprises a first frequency filter.

3. The electric power supply system according to claim 2, wherein the first frequency filter receives as input the current electric consumption,
wherein the control setpoint for the first electric source corresponds to a product of an output of the first frequency filter and a coefficient which depends on the target distribution ratio, and
wherein the control setpoint for the second electric source corresponds to a difference between the current electric consumption and the control setpoint for the first electric source.

4. The electric power supply system according to claim 2, wherein the first frequency filter receives as input a product of the current electric consumption and a coefficient which depends on the target distribution ratio,
wherein the control setpoint for the first electric source corresponds to an output of the first frequency filter, and
wherein the control setpoint for the second electric source corresponds to a difference between the current electric consumption and the control setpoint for the first electric source.

5. The electric power supply system according to claim 2, wherein the controller comprises at least two frequency filters, and
wherein the controller is configured so that the control setpoint for the first electric source corresponds to a product of the current electric consumption and a coefficient which depends on the target distribution ratio, multiplied by the product of transfer functions of various frequency filters, and the control setpoint for the second electric source corresponds to a difference between the current electric consumption and the control setpoint for the first electric source.

6. The electric power supply system according to claim 5, wherein the controller comprises two frequency filters, namely said first frequency filter and a second frequency filter,
wherein the first frequency filter receives as input the current electric consumption,
wherein the second frequency filter receives as input the product of an output of the first frequency filter and the coefficient which depends on the target distribution ratio, and
wherein the control setpoint for the first electric source corresponds to an output of the second frequency filter.

7. The electric power supply system according to claim 5, wherein the controller comprises two frequency filters, namely said first frequency filter and a second frequency filter,
wherein the first frequency filter receives as input the current electric consumption,
wherein the second frequency filter receives as input an output of the first frequency filter, and
wherein the control setpoint for the first electric source corresponds to the product of an output of the second frequency filter and the coefficient which depends on the target distribution ratio.

8. The electric power supply system according to claim 5, wherein the controller comprises two frequency filters, namely said first frequency filter and a second frequency filter,
wherein the first frequency filter receives as input the product of the current electric consumption and the coefficient which depends on the target distribution ratio,
wherein the second frequency filter receives as input an output of the first frequency filter and in that the control setpoint for the first electric source corresponds to an output of the second frequency filter.

9. The electric power supply system according to claim 2, wherein each of the frequency filters comprises at least one low-pass filter.

10. The electric power supply system according to claim 9, wherein a cut-off frequency of the low-pass filter is less than or equal to 10 seconds.

11. The electric power supply system according to claim 10, wherein the cut-off frequency of the low-pass filter is less than or equal to 5 seconds.

12. The electric power supply system according to claim 1, wherein the piece of information on the current electric consumption consumed by the set of electrical loads corresponds to a piece of information on current electrical power consumed by the set of electrical loads or to a piece of information on the current electric current consumed by the set of electrical loads.

13. The electric power supply system according to claim 1, wherein one of the first electric source and the second electric source corresponds to an electric generator mechanically coupled to a shaft of a high-pressure stage of a propulsion engine of the aircraft and the other to an electric generator mechanically coupled to a shaft of a low-pressure stage of a propulsion engine of the aircraft.

14. The electric power supply system according to claim 1, wherein the first electric source corresponds to an electric generator mechanically coupled to a propulsion engine of the aircraft and the second electric source corresponds to an electric battery or to a supercapacitor.

15. The electric power supply system according to claim 1, wherein the first electric source corresponds to a fuel cell and the second electric source corresponds to an electric battery or to a supercapacitor.

16. An aircraft comprising an electric power supply system according to claim 1.

17. The aircraft according to claim 16,
wherein the first electric source corresponds to an electric generator driven by a propulsion engine of the aircraft, and
wherein an idling speed of the propulsion engine is regulated in accordance with a mechanical power drawn by this electric generator from the propulsion engine of the aircraft at a steady speed, without leaving a margin, in order to take into account transient variations in the mechanical power which is drawn by the generator.

18. The aircraft according to claim 17, wherein regulation of the idling speed of the propulsion engine depends on phases of flight of the aircraft, the idling speed corresponding to a phase of flight being regulated in accordance with a maximum mechanical power drawn by the electric generator from the propulsion engine of the aircraft at a steady speed during this phase of flight of the aircraft.

* * * * *